US011982655B2

(12) United States Patent
Akieda et al.

(10) Patent No.: US 11,982,655 B2
(45) Date of Patent: May 14, 2024

(54) ANALYSIS APPARATUS HAVING A PLURALITY OF LIQUID CHROMATOGRAPHS AND ITS ANALYSIS METHOD

(71) Applicant: Hitachi High-Tech Corporation, Tokyo (JP)

(72) Inventors: Daisuke Akieda, Tokyo (JP); Makoto Nogami, Tokyo (JP); Iwao Suzuki, Tokyo (JP); Masako Kawarai, Tokyo (JP); Izumi Ogata, Tokyo (JP); Shinya Ito, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 472 days.

(21) Appl. No.: 17/295,345

(22) PCT Filed: Nov. 19, 2019

(86) PCT No.: PCT/JP2019/045240
§ 371 (c)(1),
(2) Date: May 19, 2021

(87) PCT Pub. No.: WO2020/105624
PCT Pub. Date: May 28, 2020

(65) Prior Publication Data
US 2021/0389287 A1 Dec. 16, 2021

(30) Foreign Application Priority Data
Nov. 20, 2018 (JP) ................................. 2018-217157

(51) Int. Cl.
*G01N 30/86* (2006.01)
*G01N 30/02* (2006.01)
(Continued)

(52) U.S. Cl.
CPC .............. *G01N 30/86* (2013.01); *G01N 30/46* (2013.01); *G01N 30/466* (2013.01);
(Continued)

(58) Field of Classification Search
CPC ...... G01N 30/24; G01N 30/34; G01N 30/466; G01N 30/477233; G01N 2030/027; G01N 2030/628
(Continued)

(56) References Cited

U.S. PATENT DOCUMENTS

2002/0084222 A1 7/2002 Brann
2002/0107652 A1 8/2002 Andrews et al.
(Continued)

FOREIGN PATENT DOCUMENTS

GB 2564988 A 1/2019
JP 7-103959 A 4/1995
(Continued)

OTHER PUBLICATIONS

Shimizu et al. , JP 2008224559 A, "Liquid Chromatograph", Date Published: Sep. 25, 2008 (Year: 2008).*
(Continued)

*Primary Examiner* — John H Le
(74) *Attorney, Agent, or Firm* — Crowell & Moring LLP

(57) ABSTRACT

The present invention makes it possible to realize an analysis apparatus having a plurality of liquid chromatographs capable of judging separation performance and the like at the right timing and improving analysis performance early. Analysis starts and a mixed sample is prepared by adding a non-retaining ingredient to a measurement object sample and is introduced into an analysis flow path (S401 to S404). The mixed sample is separated into components by a separation column, the components are outputted as chromatogram data by a detector, and the analysis finishes (S404 to
(Continued)

S406). Retention time and peak information are acquired from the chromatogram outputted from the detector, whether or not a measurement result is within an allowable range is judged, and the process shifts to next analysis when the measurement result is within the allowable range (S407 to S409). An amount of transit time $t_0$ of a non-retaining ingredient shifted from an allowable value is confirmed when separation performance is outside an allowable range at step S408 and a separation column replacement instruction is outputted to an output unit when fluctuation of the transit time $t_0$ is within an allowable range (S410, S411). A device maintenance instruction is outputted to the output unit when the fluctuation is outside the allowable range at step S410 (S412).

11 Claims, 9 Drawing Sheets

(51) Int. Cl.
    *G01N 30/24*   (2006.01)
    *G01N 30/34*   (2006.01)
    *G01N 30/46*   (2006.01)
    *G01N 30/62*   (2006.01)
    *G01N 30/72*   (2006.01)

(52) U.S. Cl.
    CPC ... *G01N 30/7233* (2013.01); *G01N 2030/027* (2013.01); *G01N 30/24* (2013.01); *G01N 30/34* (2013.01); *G01N 2030/628* (2013.01)

(58) Field of Classification Search
    USPC .......................................................... 702/30
    See application file for complete search history.

(56) References Cited

U.S. PATENT DOCUMENTS

| | | | |
|---|---|---|---|
| 2007/0278395 A1* | 12/2007 | Gorenstein | H01J 49/022 250/281 |
| 2014/0033793 A1 | 2/2014 | Thorson et al. | |

FOREIGN PATENT DOCUMENTS

| | | | |
|---|---|---|---|
| JP | 2004-515770 | A | 5/2004 |
| JP | 2004-524518 | A | 8/2004 |
| JP | 2006-84308 | A | 3/2006 |
| JP | 2008-224559 | A | 9/2008 |
| JP | 4372419 | B2 | 11/2009 |
| JP | 2017-138248 | A | 8/2017 |
| WO | WO 02/053255 | A1 | 7/2002 |
| WO | WO 2014/204893 | A1 | 12/2014 |
| WO | WO 2017/216934 | A1 | 12/2017 |

OTHER PUBLICATIONS

Wakabayashi, JP 2010102405 A, "Client-Server Type Analysis System", Date Published: May 6, 2010 (Year: 2010).*

Extended European Search Report issued in European Application No. 19886510.7 dated Jun. 27, 2022 (nine (9) pages).

International Preliminary Report on Patentability (PCT/IB/338 & PCT/IB/373) issued in PCT Application No. PCT/JP2019/045240 dated Jun. 3, 2021, including partial English translation of document C2 (Japanese-language Written Opinion (PCT/ISA/237) filed on May 19, 2021) (nine (9) pages).

International Search Report (PCT/ISA/210) issued in PCT Application No. PCT/JP2019/045240 dated Feb. 18, 2020 with English translation (six (6) pages).

Japanese-language Written Opinion (PCT/ISA/237) issued in PCT Application No. PCT/JP2019/045240 dated Feb. 18, 2020 (four (4) pages).

HPLC Q&A, "Eki Kuro Tora No Maki, HPLC that no one could ask Q&A", p. 8, question 5, Nov. 22, 2001, University of Tsukuba Press (two (2) pages).

HPLC Q&A, "Eki Kuro Inu No Maki, HPLC that no one could ask Q&A", p. 145, question 74, Dec. 10, 2004, University of Tsukuba Press (two (2) pages).

HPLC Q&A, "Eki Kuro Ryu No Maki, HPLC that no one could ask Q&A", pp. 42-43, question 23, Nov. 30, 2002, University of Tsukuba Press (three (3) pages).

Japanese-language Office Action issued in Japanese Application No. 2020-558419 dated Jan. 10, 2023 with English translation (nine (9) pages).

English abstract of document C3, filed on May 19, 2021 (one (1) page).

English abstract of document C4, filed on May 19, 2021 (one (1) page).

English abstract of document C5, filed on May 19, 2021 (one (1) page).

* cited by examiner

FIG. 8
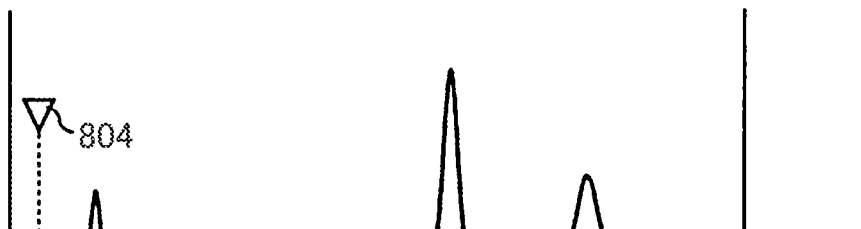
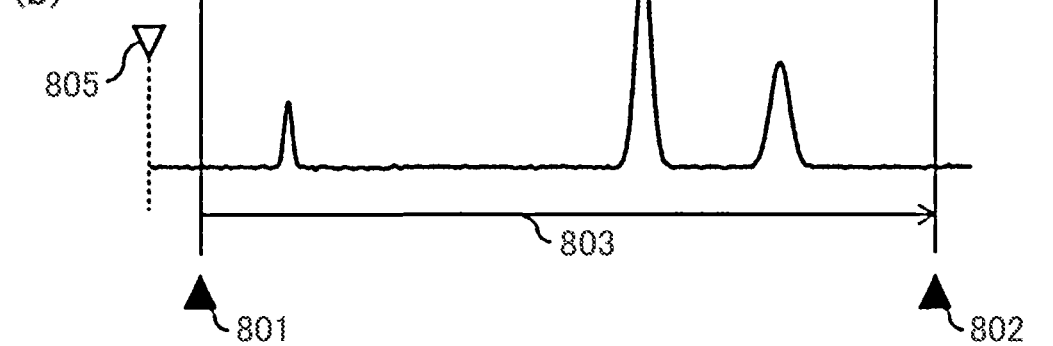

ANALYSIS APPARATUS HAVING A PLURALITY OF LIQUID CHROMATOGRAPHS AND ITS ANALYSIS METHOD

TECHNICAL FIELD

The present invention relates to an analysis apparatus having a plurality of liquid chromatographs and its analysis method.

BACKGROUND ART

Liquid chromatograph (LC) is a chromatograph using liquid for a mobile phase fed to a separation column separating a sample and is an analysis apparatus in which a liquid sample including a measuring object is fed to the separation column by the mobile phase and is separated into each component included in the sample using the difference in affinity between the fixed phase filled in the separation column and the mobile phase, and each component separated are detected using detectors such as an ultraviolet/visible absorptiometer, fluorophotometer, and mass spectrometer.

Measured data of the liquid chromatograph are displayed by peaks showing a relation between the separation time (retention time) of the sample and the detection signal intensity of the detector, and the retention time is the time of the peak top, shows a generally same value for each sample component if the analysis condition is same and is therefore used as information for identifying the separated component.

On the other hand, the detected signal intensity has a correlative relationship with the sample concentration and is used as information for calculating the concentration of the separated component, and the retention time and the signal intensity of the peak of the separated component allow to identify the separated component and to determine the concentration in the liquid chromatograph.

Aiming to shorten the analysis time and to improve the separation performance, the liquid chromatograph called a High Performance Liquid Chromatograph (HPLC) is featured to decrease the particle diameter of the filling material of the separation column and to execute analysis using solvent that is high-pressure compressed by a liquid feeding device, and there is also a liquid chromatograph called an Ultra High Performance Liquid Chromatograph (UHPLC) that uses a separation column using a filling material with 2 µm or less particle diameter aiming to improve the separation performance and to shorten the analysis time of HPLC.

In recent years, there increases a chance of using a Liquid Chromatograph-Mass Spectrometry (LC-MS) connected with a Mass Spectrometry (MS) as a detector in HPLC and UHPLC for the clinical inspection field such as measurement of the drag content and the metabolite in a biological sample. In the analysis aiming such measurement, higher sensitivity, reproducibility, throughput performance, and the like have been desired, and such system as described in Patent Literature 1 for example has been proposed in which a mass spectrometry is as the detector, multiple liquid chromatographs are connected in parallel, and thereby improvement of the throughput is achieved.

However, in a case of analysis by a liquid feeding condition with a small liquid feeding flow rate as required for the LC-MS system, there is a case that difference in the separation performance of the object sample is confirmed as the device difference among different analysis apparatuses having the same configuration, the main cause of these device differences are considered to be the performance difference among the columns, the effect of the surrounding environment of the analysis apparatus, and so on other than the dispersion of the capacity caused by the tolerance of piping from the liquid feeding device to the detector, the device difference of the liquid feeding performance of the liquid feeding device, and wear of the high-pressure resistance components.

As described above, since the separation information such as the retention time is used as the information for identifying/quantitating the separated component in the liquid chromatograph, it is preferable that there is no device difference among the devices and the columns. In order to operate the device stably, in many cases, the device difference or the difference in the separation performance allowable according to the measurement object is set, maintenance of the device is executed in order to achieve the performance of the device, the correction parameter and the like are provided according to the needs, and the column replacement timing is judged from the analysis result.

For example, in Patent Literature 2, a means for correcting the dispersion of the retention time among the devices has been proposed.

CITATION LIST

Patent Literature

Patent Literature 1: Japanese Patent No. 4372419
Patent Literature 2: Japanese Unexamined Patent Application Publication No. 2017-138248

SUMMARY OF INVENTION

Technical Problem

However, according to the technology described in Patent Literature 2, although the difference of the flow passage volume and the difference of the retention time of the separated component calculated from the measurement result are inputted to the analysis condition and the analysis start timing is adjusted as one means for solving the device difference of the retention time, since correction is made without considering the cause of the dispersion from the difference of the flow passage volume and the measurement result according to this method, it is possible to take in a defect of the system to be improved such as the wear of the seal of the high-pressure resistance component and the change of the performance of the column for example to the correction value.

Also, even when the device acquires a correction value in a good status, not only that the device difference occurs due to the change of the performance of the separation column and the wear of the component of the device while the liquid chromatograph system is used, but such case is also possible that the correction value becomes inadequate due to the change of the separation column and the maintenance work of the device.

Therefore, in order to adequately manage the device difference and to operate the device, it is required not only to acquire the correction value by an adequate method and at proper timing, but also to precisely grasp the performance of the separation column and the device status and to maintain the adequate status. Accordingly, it is preferable that a user continuously monitors the change of the separation performance of the separation column, the column and the consumable component are replaced at adequate timing before occurrence of such change of the separation performance that reliability of the analysis result may be lost, and the correction value is updated according to the needs.

Particularly, in an LC system where multiple liquid chromatographs or separation units of the liquid chromatograph are connected in parallel, when there exists the device difference among the liquid chromatographs connected in parallel, it is possible that different analysis results are outputted within one measurement device.

The object of the present invention is to realize an analysis apparatus having multiple liquid chromatographs capable of judging separation performance and the like at the adequate timing and improving analysis performance early and an analysis method of the analysis apparatus.

Solution to Problem

In order to achieve the object described above, the present invention is configured as described below.

In an analysis apparatus having multiple liquid chromatographs including the multiple liquid chromatographs each of which has a separation column to receive a sample and separate the received sample into components, a detector to detect the components of the sample fed from each of the multiple liquid chromatographs, a data processing unit to process detection data detected by the detector, and a device control unit to control the multiple liquid chromatographs and the detector, the device control unit judges a device status of the multiple liquid chromatographs in accordance with data that is obtained by detecting a non-retaining ingredient sample introduced into any one of the multiple liquid chromatographs and not retained by the separation columns by the detector and that is processed by the data processing unit.

Also, in an analysis method of multiple liquid chromatographs including the multiple liquid chromatographs each of which has a separation column to receive a sample and separate the received sample into components, a detector to detect the components of the sample fed from each of the multiple liquid chromatographs, a data processing unit to process detection data detected by the detector, and a device control unit to control the multiple liquid chromatographs and the detector, a non-retaining ingredient sample introduced into any one of the multiple liquid chromatographs and not retained in the separation column is detected by the detector, and a device status of the multiple liquid chromatographs is judged in accordance with detected data.

Advantageous Effects of Invention

According to the present invention, it is possible to realize an analysis apparatus having multiple liquid chromatographs capable of judging separation performance and the like at the adequate timing and improving analysis performance early and an analysis method of the analysis apparatus.

BRIEF DESCRIPTION OF THE DRAWINGS

FIGS. 8A and 8B constitute a view schematically showing chromatograms in the automatic adjustment process shown in FIG. 7.

DESCRIPTION OF EMBODIMENTS

Below, as an embodiment of an analysis apparatus including multiple liquid chromatographs and an analysis method of the analysis apparatus related to the present invention, an LC system having a preprocessing function will be described.

Also, embodiments of the present invention are not limited to the first to the third embodiments described below, and application is possible within a range of their technical thought for example such as using a visible/ultraviolet absorptiometer, photodiode array detector, fluorodetector, mass spectrometer, and the like as the detector.

EMBODIMENTS

First Embodiment

Figure 1:
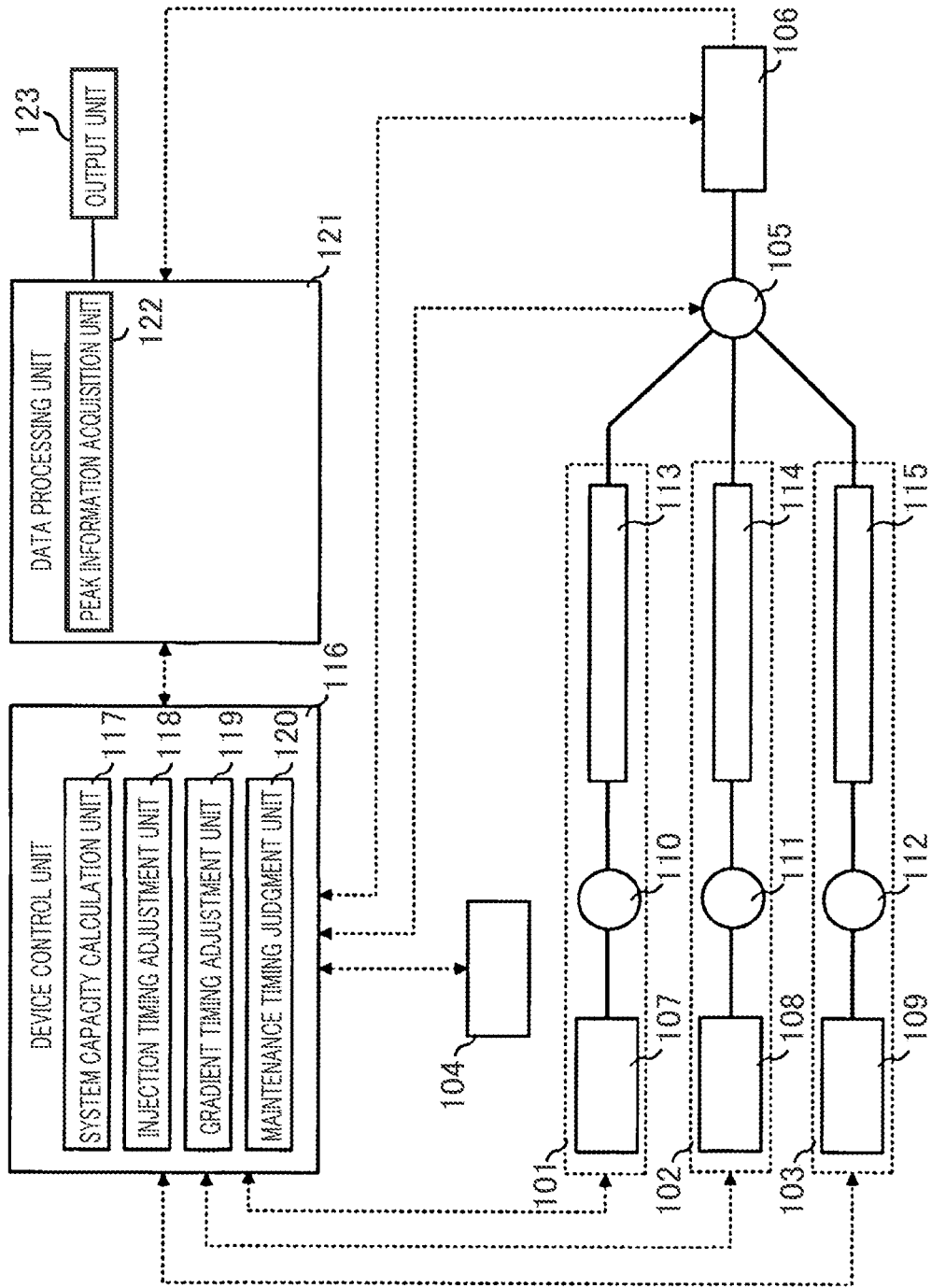
FIG. 1 is an overall schematic configuration diagram of an LC system to which the present invention is applied.

FIG. 1 is an overall schematic configuration diagram of an LC system to which the first embodiment of the present invention is applied.

In FIG. 1, the LC system includes multiple LC units (liquid chromatographs) 101, 102, and 103 configured of liquid feeding devices 107, 108, and 109 high-pressure feeding a mobile phase, sample introduction units 110, 111, and 112, and separation columns 113, 114, and 115 separating the sample into each component. Also, the LC system includes a sample dispensing mechanism 104, a switching valve 105, and a detector 106, the sample dispensing mechanism 104 introducing the sample to the sample introduction units 110, 111, 112 of each LC unit 101, 102, 103, the switching valve 105 being connected to the LC units 101, 102, 103 by flow passages, the detector 106 being a detector connected to the downstream side of the switching valve 105 by a flow passage. The detector 106 detects the component of the sample fed from the LC units 101, 102, 103.

Also, the LC system includes a device control unit 116 and a data processing unit 121, the device control unit 116 controlling the respective LC units 101, 102, 103, the sample dispensing mechanism 104, the switching valve 105, and the detector 106, the data processing unit 121 processing the measurement result (detection data) outputted from the detector 106.

Flow passages connecting the LC units 101, 102, and 103 and the detector 106 are connected so that the design piping capacity becomes equal. The sample dispensing mechanism 104 introduces a mixed sample from the sample introduction units 110, 111, 112 to an analysis flow passage of the LC units (liquid chromatographs) 101, 102, 103 and the mixed sample introduced is separated into each component in the separation columns 113, 114, 115 according to the chemical property, the mixed sample being prepared by adding a non-retaining ingredient sample to a measurement object sample, the non-retaining ingredient sample being a non-retaining ingredient (ingredient not retained) in the separation columns 113, 114, 115. At this time, there is a case that the separation columns 113, 114, 115 are stored in a column oven in order to keep the temperature inside the column constant.

Also, the device control unit 116 includes a system capacity calculation unit 117, an injection timing adjustment unit 118, a gradient timing adjustment unit 119, and a maintenance timing judgment unit 120. Also, the data processing unit 121 includes a peak information acquisition unit 122, and an output unit 123 is connected to the data processing unit 121.

Figure 2:
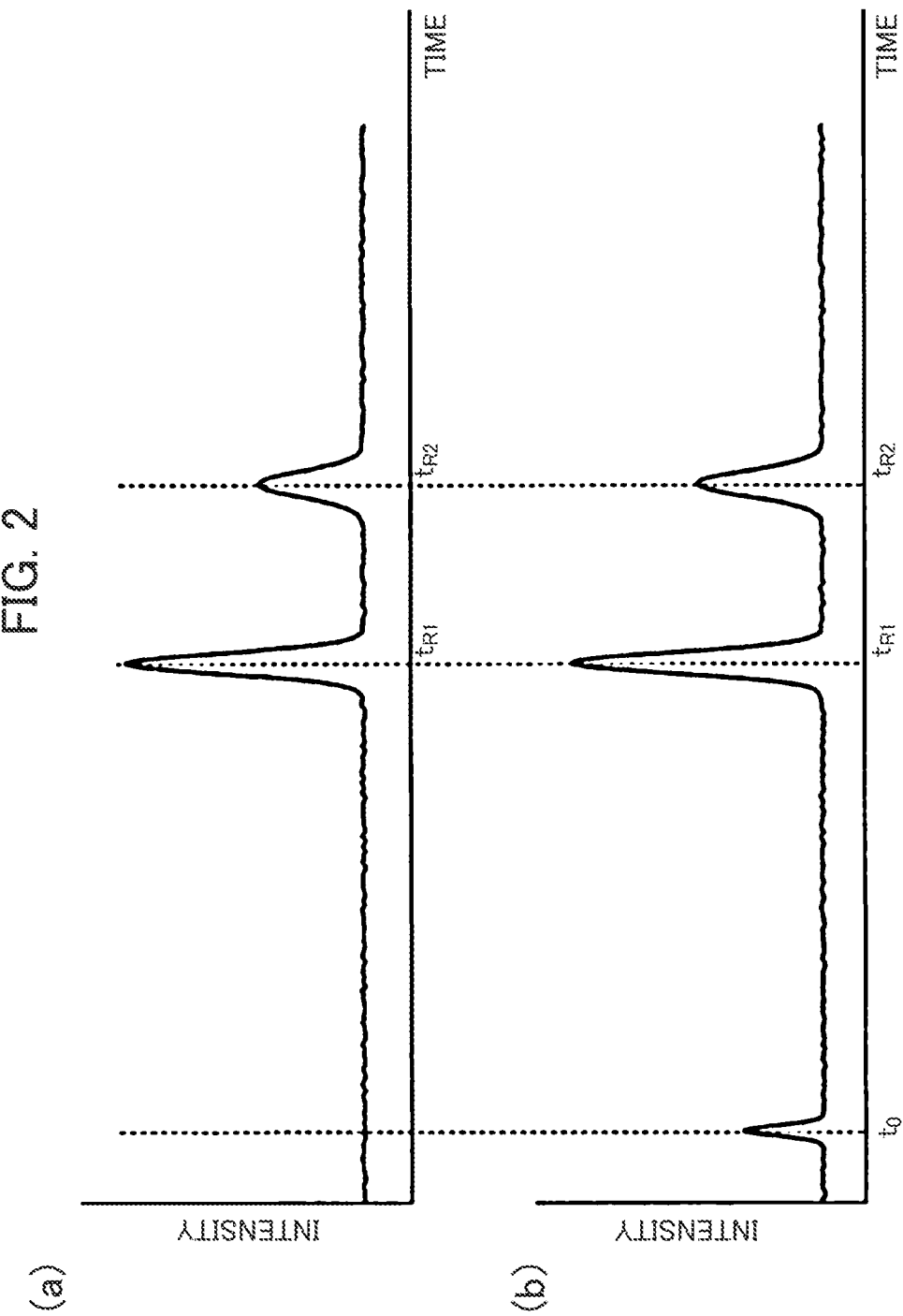
FIGS. 2A and 2B show schematic diagrams of chromatograms in presence and absence of a non-retaining ingredient in a separation column.

FIG. 2 is schematic diagrams of chromatograms in presence and absence of a non-retaining ingredient in the separation columns 113, 114, 115, the vertical axis represents the signal intensity, and the horizontal axis represents the time. In FIG. 2, (a) shows a chromatogram of a case the non-retaining ingredient is not added, and retention time $t_{R1}$ and $t_{R2}$ of each component obtained by separating the measurement object sample by interaction against the separation column are detected by the detector 106.

On the other hand, (b) of FIG. 2 shows a chromatogram of a case the non-retaining ingredient is added, and the column non-retaining ingredient added is detected by the time ($t_0$) for passing through the volume of the flow passage and the dead volume of the separation column since the column non-retaining ingredient has no interaction against the separation column.

Thus, since the non-retaining ingredient has no interaction against the separation column, the time $t_0$ and the peak shape of the non-retaining ingredient do not change unless the dead volume of the piping and the separation column and the liquid feeding rate of the solvent change, the non-retaining ingredient can be used as a parameter for judging the device status of the liquid chromatograph.

Figure 3:
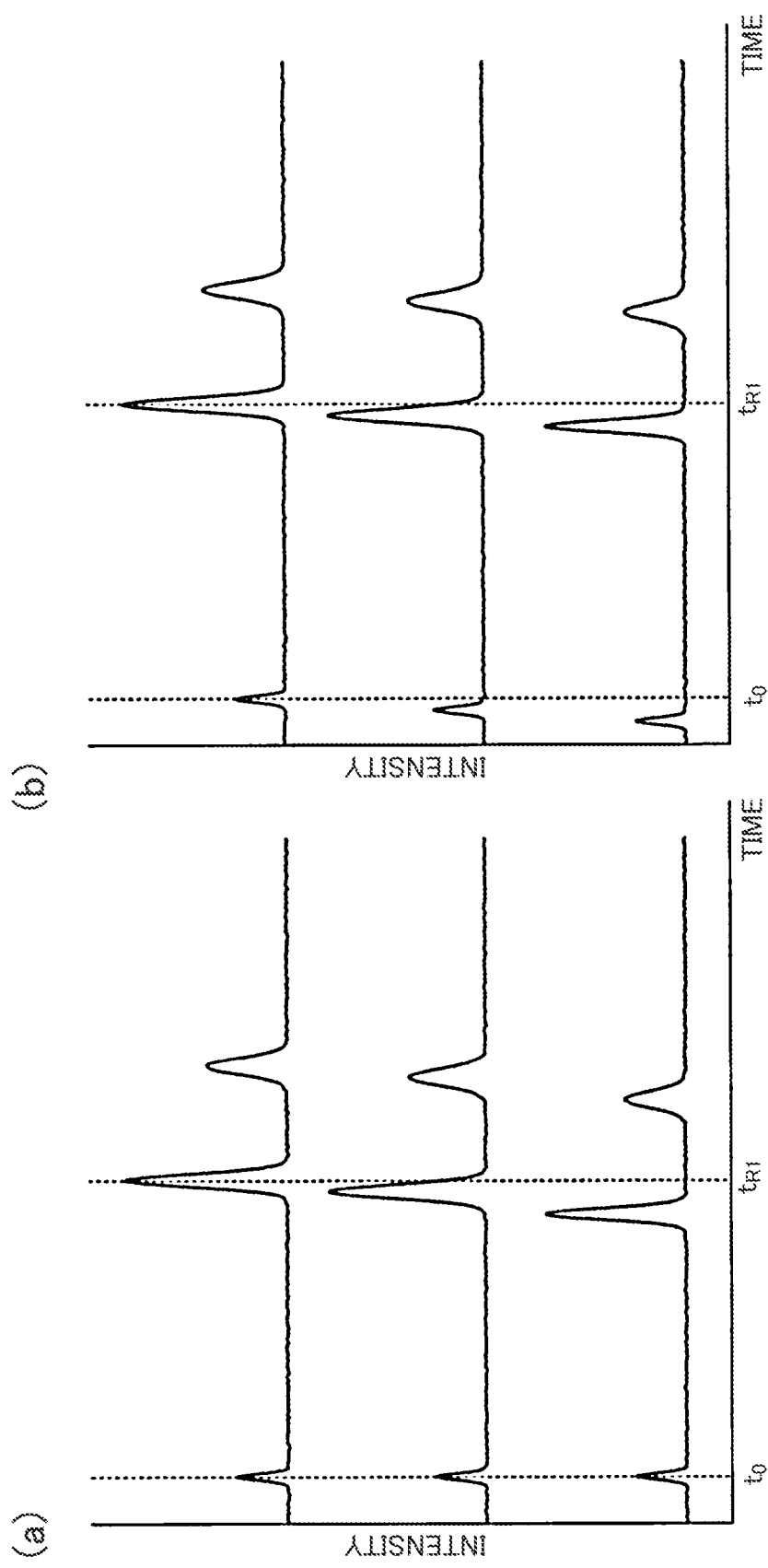
FIG. 3A shows schematic diagrams of chromatograms in assuming retention time of each peak in a chromatogram as a parameter to judge a device status.
FIG. 3B shows schematic diagrams of chromatograms in assuming retention time of each peak in a chromatogram as a parameter to judge a device status.

FIG. 3A and FIG. 3B are schematic diagrams of chromatograms in assuming retention time of each peak in a chromatogram as a parameter to judge a device status. FIG. 3A shows three chromatograms measured in each elapsed time when elapsed time of use is different. In the measurement result shown by the three chromatograms, although the retention time $t_{R1}$ of the separated component $t_R$ of the measurement object sample fluctuates and each of them are differ from each other, the passing time $t_0$ of the separation column of the non-retaining ingredient does not fluctuate among three chromatograms. This implies that there is not any problem on the device side such as the change of the liquid feeding flow rate and liquid leakage from the piping, but the performance of the separation column may possibly change.

In contrast to FIG. 3A, in an example shown in FIG. 3B, since all of the retention time $t_{R1}$ of the separated component $t_R$ of the measurement object sample and the passing time $t_0$ of the non-retaining ingredient fluctuate from each other, there is a possibility of the change of the liquid feeding flow rate, liquid leakage from the piping and so on, it can be judged that maintenance of the device is required. Also, in the description of the present application, the passing time $t_0$ of the non-retaining ingredient is also expressed as the retention time $t_0$ of the non-retaining ingredient.

Although the retention time and the passing time of each peak were assumed to be an index for judging the device status in FIG. 3A and FIG. 3B, more precise judgment can be achieved by using separation information of the peak other than that, such as the area and the height of the peak, the symmetry factor, and the theoretical number of step for example.

Figure 4:
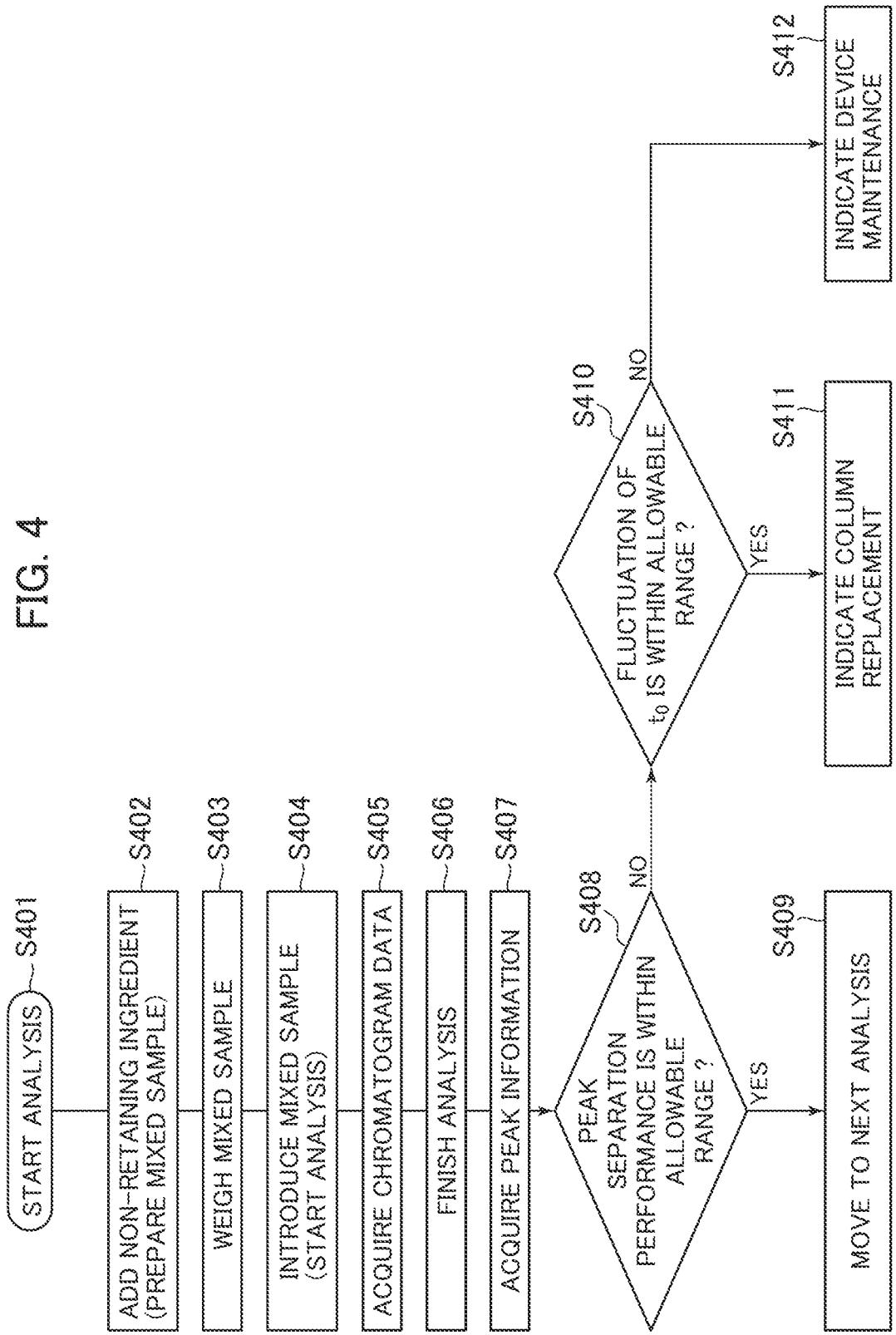
FIG. 4 is a flowchart showing an example of processes to judge a device status from a chromatogram obtained by adding a non-retaining ingredient in a separation column.

FIG. 4 is a flowchart in an example of processes to judge a device status of the liquid chromatograph from a chromatogram obtained by adding a non-retaining ingredient (uracil for example) in the separation columns 113, 114, 115 to the measurement object sample and introducing the same to any one of the multiple LC units (liquid chromatographs) 101, 102, 103.

In FIG. 4, a signal for starting the analysis is inputted to the device control unit 116 (step S401). The sample dispensing mechanism 104 adds the non-retaining ingredient to the measurement object sample introduced to the separation columns 113, 114, 115, and prepared the mixed sample (step S402). At this time, the preparation work for the mixed sample may be by a method of adding the non-retaining ingredient to a container storing the measurement sample for mixing, or may be by a method of dispensing the measurement sample and the non-retaining ingredient to different containers for mixing. The non-retaining ingredient may be 10-20% for example relative to the measurement object sample.

After completion of preparation of the mixed sample, the volume of the mixed sample required for the analysis is weighed by the sample dispensing mechanism 104 (step S403) and is introduced into the analysis flow passage from the sample introduction units 110, 111, 112 (step S404). After the mixed sample is separated into each component by the separation columns 113, 114, 115, the separation result is outputted to the data processing unit 121 as a chromatogram data by the detector 106 (step S405), and the analysis finishes (step S406).

The peak information acquisition unit 122 of the data processing unit 121 acquires the peak information of each component starting with the retention time from the chromatogram outputted from the detector 106 (step S407), the device control unit 116 judges whether the measurement result of them is within the peak separation allowable range having been set (whether the separation time of the retention time $t_{R1}$ and $t_{R2}$ of every separated component is within the allowable range, and so on) (step S408), and the process is shifted to the next analysis by the device control unit 116 when the result is within the allowable range (step S409).

When the peak separation performance is out of the allowable range in the judgment work (step S408) of the allowable range, the device control unit 116 confirms the shift amount of the passing time $t_0$ of the non-retaining ingredient having been added from the allowable value having been set (step S410).

When the fluctuation amount of the passing time (retention time) $t_0$ is within the fluctuation allowable range in step S410, the device control unit 116 judges that the device status of the LC units 101, 102, 103 is normal and outputs (displays and so on) the command to replace the separation column to the output unit 123 (step S411).

When the fluctuation of the passing time $t_0$ is out of the allowable range in step S410, the device control unit 116 outputs (displays and so on) the command of maintenance of the device to the output unit 123 (step S412).

In the process shown in FIG. 4, it is required to add the non-retaining ingredient with the aim of monitoring the device status which may possibly become one cause of increasing the analysis cost. Therefore, it is preferable that the column non-retaining ingredient which is an unnecessary sample in a normal analysis process is added only at required timing.

Figure 5:
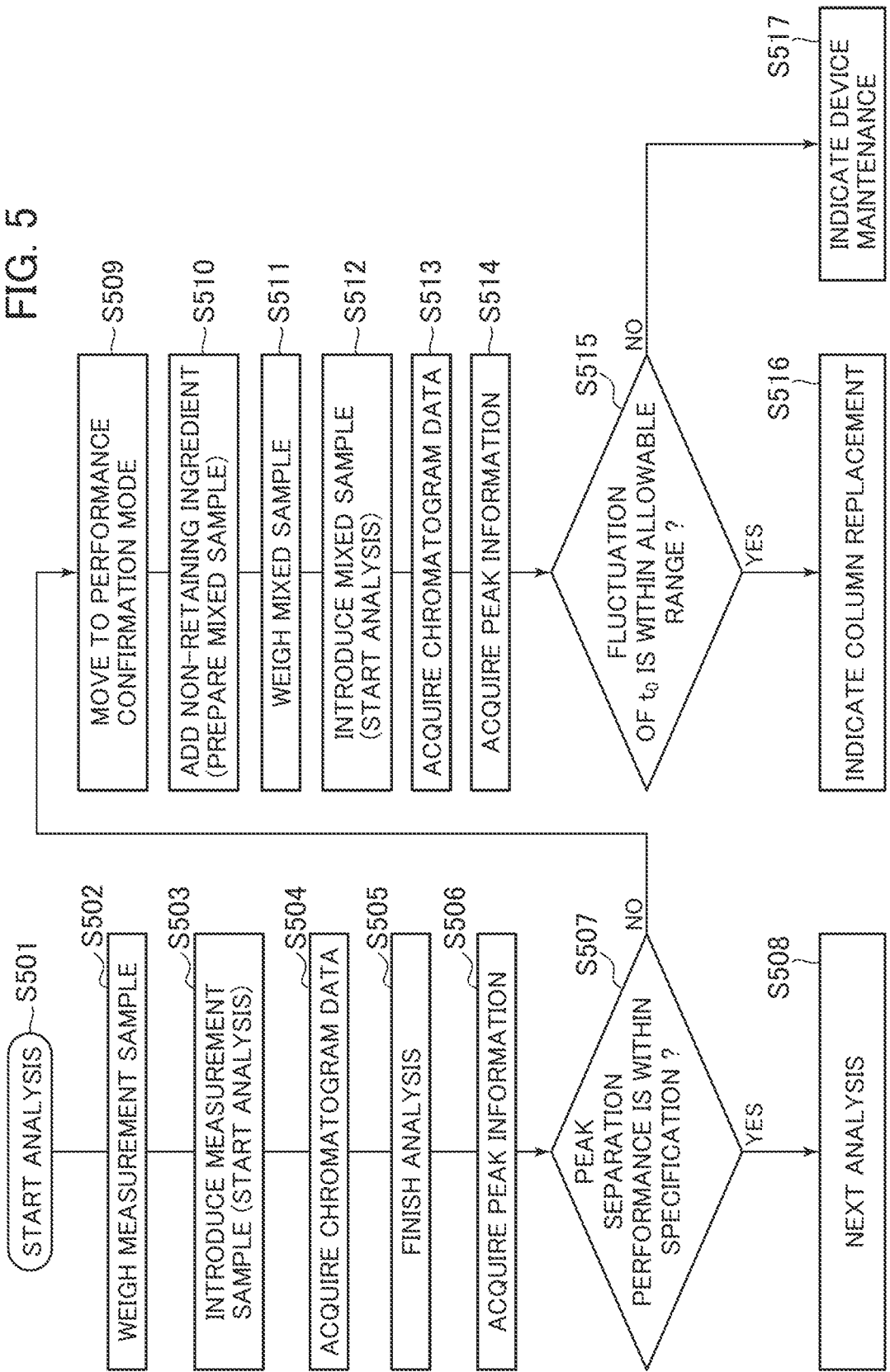
FIG. 5 is a flowchart showing another example of processes to judge a device status from a chromatogram obtained by adding a non-retaining ingredient in a separation column.

FIG. 5 is a flowchart of a process to judge a device status by a flow different from that shown in FIG. 4.

The example shown in FIG. 5 is the process of shifting to the performance confirmation mode using the column non-retaining ingredient as an additive only when the peak separation performance of the measurement object sample is judged to be out of the allowable range. In this process, it is required to acquire the passing time $t_0$ while the device is in a normal status, the passing time $t_0$ becoming a reference at the time of introducing the device or after execution of the maintenance of the device for example.

In FIG. 5, since the non-retaining ingredient is not added in a normal analysis process, an analysis starting signal inputted from the device control unit 116 is inputted to each unit of the device (step S501). The sample dispensing mechanism 104 weighs the measurement object sample of a volume required for the analysis (step S502). The sample having been weighed is introduced to the analysis flow passage from the sample introduction units 110, 111, 112 to start the analysis (step S503), is separated into each component by the separation columns 113, 114, 115, and is thereafter outputted to the data processing unit 121 as a chromatogram data in the detector 106 (step S504), and the analysis finishes (step S505).

The peak information acquisition unit 122 of the data processing unit 121 acquires peak information of each component starting with the retention time from the chromatogram outputted from the detector 106 (step S506), the device control unit 116 judges whether the measurement result (peak separation performance) of them is within the allowable range having been set (step S507), and the process is shifted to the next analysis by the device control unit 116 when the measurement result is within the allowable range (step S508).

When the peak separation performance is judged to be out of the allowable limit in step S507, the LC system is shifted to the performance confirmation mode (step S509), and the sample dispensing mechanism 104 adds the column non-retaining ingredient to the measurement object sample and prepares the mixed sample (step S510).

In the process shown in FIG. 5, since the non-retaining ingredient is added according to the needs, a method of dispensing the measurement sample and the non-retaining ingredient into different containers for mixing is preferable. The sample dispensing mechanism 104 weighs the volume required for the analysis with respect to the prepared mixed sample (step S511), the volume required for the analysis of the adjusted mixed sample is introduced from the sample introduction units 110, 111, 112 to the analysis flow passage, and the analysis is started (step S512).

Also, the analysis result is outputted to the data processing unit 121 as the chromatogram data by the detector 106 (step S513), and the peak information is acquired in the peak information acquisition unit 122 of the data processing unit 121 (step S514). The device control unit 116 compares the passing time $t_0$ obtained from the calculated peak information and the passing time $t_0$ acquired beforehand, stored, and becoming the reference, and judges whether the fluctuation is within the allowable range (step S515). When the fluctuation of the passing time $t_0$ becoming the measured value is within the allowable range, the device status is judged to be normal, and the command of column replacement is outputted to the output unit 123 (step S516).

When the fluctuation of the passing time $t_0$ becoming the measurement value with respect to the passing time $t_0$ of the reference value is out of the allowable range in step S515, the device status is judged to be inadequate, and the command of device maintenance is outputted to the output unit 123 (step S517).

As described above, according to the first embodiment of the present invention, the peak separation performance of the measurement object sample and the fluctuation of the passing time of the non-retaining ingredient are judged, and the command of replacement of the separation column and the command of device maintenance of the LC system can be executed early and adequately.

Accordingly, it is possible to achieve an analysis apparatus having multiple liquid chromatographs capable of judging deterioration of the separation performance and the like at adequate timing and improving the analysis performance early and its analysis method.

Second Embodiment

Next, the second embodiment of the present invention will be explained.

Since the LC system has a similar configuration in the first embodiment and the second embodiment, illustration and detailed explanation will be omitted.

The second embodiment is an example of correcting the device difference of the retention time among the devices occurring in spite that the devices configuring the LC system are normal and the analysis is executed by the separation column of a same kind from the passing time $t_0$ that is the retention time of the non-retaining ingredient of the separation column in the LC system shown in FIG. 1, multiple LCs being connected to the LC system.

Since the correction parameter is required to be acquired when the device is in a normal status, it is preferable to be acquired at the time of introducing the device of the LC system or after executing the maintenance.

Figure 6:
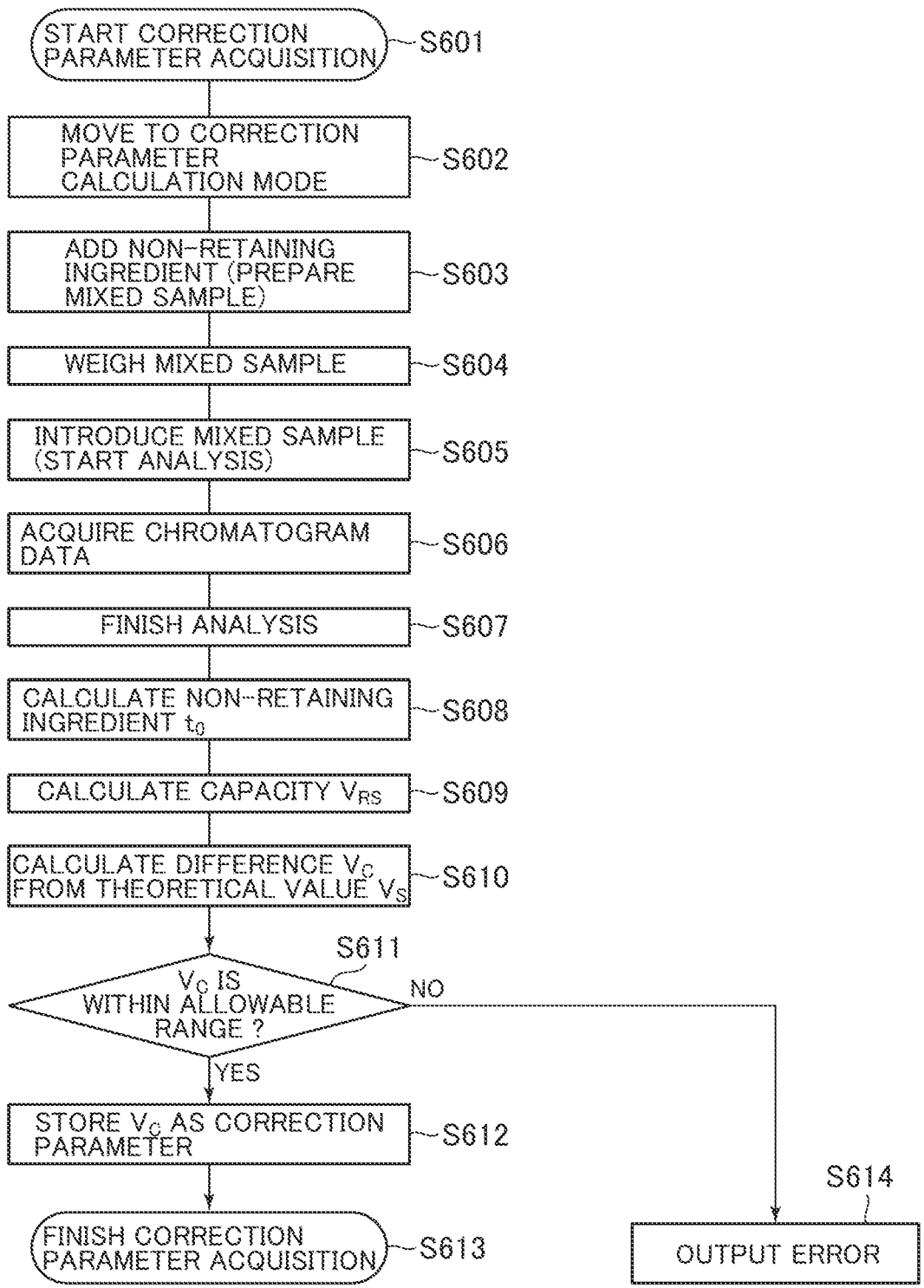
FIG. 6 is a flowchart showing processes to acquire a correction parameter to correct device difference according to a second embodiment.

FIG. 6 is a flowchart showing processes to acquire a correction parameter to correct device difference in the second embodiment.

In FIG. 6, when the correction parameter acquisition process is started (step S601), the device control unit 116 is shifted to the correction parameter calculation mode (step S602), and the sample introduction unit 104 adds the non-retaining ingredient to the measurement object sample and prepare the mixed sample (step S603).

With respect to the mixed sample prepared in step S603, a volume portion required for acquisition of the correction parameter is weighed (step S604) and is introduced to the analysis flow passage from the sample introduction units 110, 111, 112 (step S605). Also, the mixed sample is separated into each component in the separation columns 113, 114, 115 and is detected as the chromatogram data by the detector 106 (step S606), and the analysis finishes (step S607).

The data processing unit 121 calculates the retention time (passing time) $t_0$ of the column non-retaining ingredient from the chromatogram data having been acquired (step S608), and calculates the capacity ($V_{RS}$) from the sample introduction units 110, 111, 112 to the detector 106 that is the detection unit (detector) by using the following expression (1) making the feeding liquid flow rate Q used in the analysis as the calculation condition (step S609). With respect to the capacity $V_{RS}$, since the device difference of the LC units 101, 102, 103 having been connected should be corrected, the chromatogram is acquired for each of the LC units 101, 102, 103, and the capacity $V_{RS}$ is calculated. The correction parameter $V_C$ is calculated using the following expression (2) from the difference of the reference value $V_S$ of the capacity determined beforehand by the device configuration and the separation column used and $V_{RS}$ having been calculated (step S610).

$$V_{RS} = t_0[\text{min}] \times Q[\text{mL/min}] \quad (1)$$

$$V_C = V_S[\text{mL}] - V_{RS}[\text{mL}] \quad (2)$$

By the device control unit 116, the correction parameter $V_C$ having been calculated is compared to the allowable value having been set beforehand and is judged to be within the allowable range or not (step S611), is stored as the correction value (correction parameter) of the device capacity when the separation column used in acquiring the parameter is used only when the correction parameter $V_C$ is within the allowable range (step S612), and the correction parameter acquisition process is finished (step S613).

When the correction parameter $V_C$ having been calculated becomes a value out of the allowable range in step S611, it is judged that the device or the separation column is in an inadequate status and an error is outputted from the output unit 123 (step S614). As an example that the device or the separation column is in an inadequate status, there is a connection error of the flow passage piping.

Figure 7:
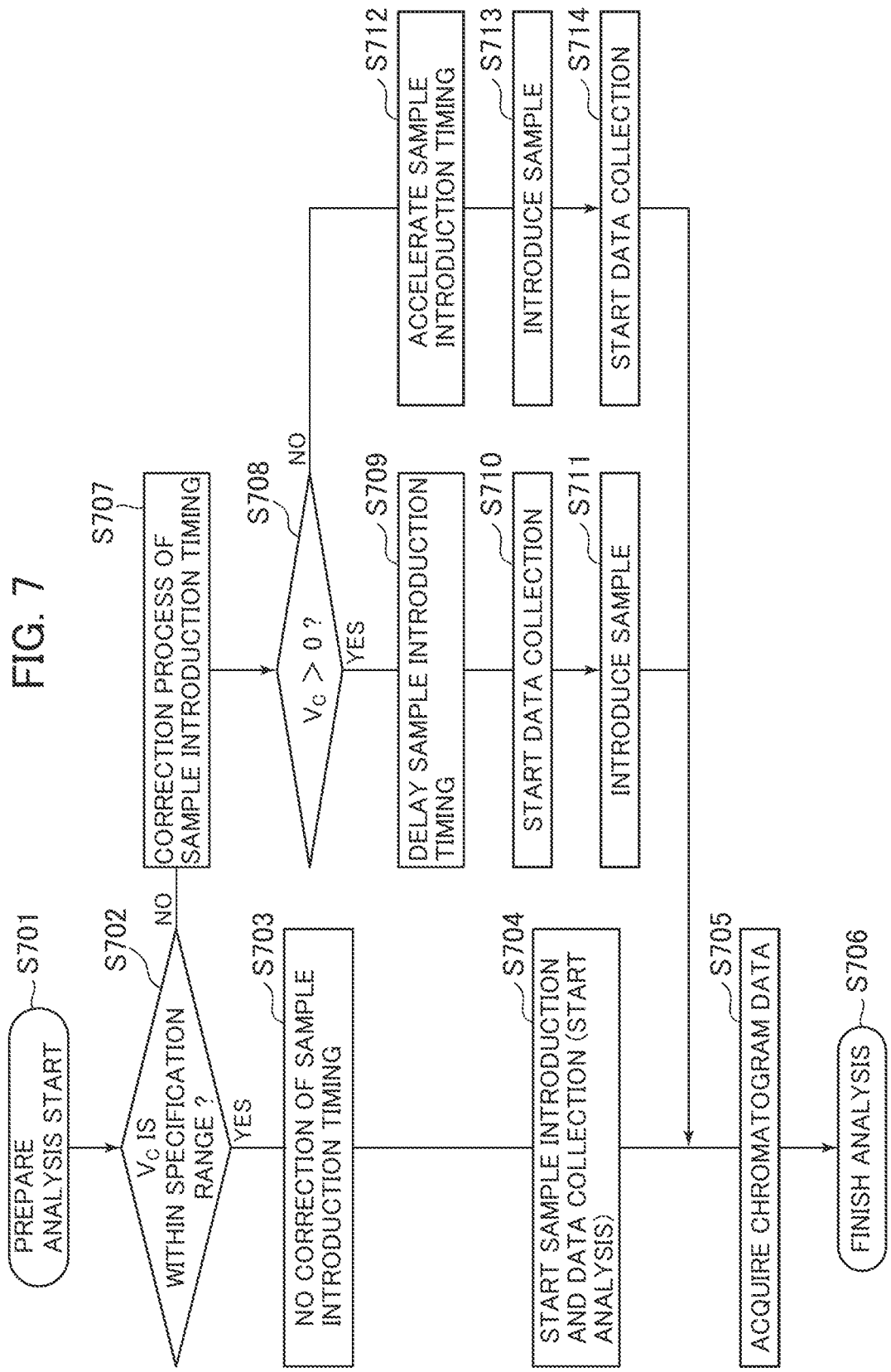
FIG. 7 is a flowchart showing processes to automatically adjust a sample injection timing by using a correction value of a device capacity calculated through the flowchart shown in FIG. 6.

FIG. 7 is a flowchart showing processes to automatically adjust (control) the sample injection timing (sample introduction timing) by the device control unit 116 using the correction value $V_C$ of the device capacity calculated through the flowchart shown in FIG. 6.

In FIG. 7, when the signal of starting the analysis is inputted, the device control unit 116 starts to read the correction value $V_C$ of each of the LC units 101, 102, 103 having been stored as preparation for starting the analysis (step S701), and judges whether the correction value $V_C$ is within the specification range having been set beforehand (step S702).

When it is judged that the correction value $V_C$ is within the specification range in step S702, it is judged that correction of the sample introduction timing is not required (step S703), and introduction of the sample and collection of the data are started to start the analysis (step S704).

When it is judged that the correction value $V_C$ is out of the specification range having been set in step S702, it is judged that correction of the sample introduction timing is required, and the correction process of the sample introduction timing is started (step S707). In the correction process of the sample introduction timing, whether the correction value $V_C$ is plus or minus is judged first (step S708). When the correction value $V_C$ is a value greater than 0, since it shows that the capacity $V_{RS}$ is less than the system capacity becoming the reference and the retention time $t_0$ is detected in an early period of time, the sample introduction timing is delayed (step S709), data collection having been set is started (step S710), and the sample is thereafter introduced (step S711). Thus, adjustment is executed.

In step S708, when the correction value $V_C$ is a value equal to or less than 0, since it shows that the capacity $V_{RS}$ is greater than the system capacity becoming the reference and the retention time $t_0$ is detected in a later period of time, the sample introduction timing is advanced (step S712), and the sample is introduced (step S713) before data collection having been set is started (step S714). Thus, adjustment of the retention time is executed.

Also, acquisition of the chromatogram data is executed after steps S704, S711, and S714 finish (step S705), and the analysis is finished (step S706).

Although adjustment of the device difference of the retention time is executed by adjusting the sample injection timing in the present second embodiment, when the liquid feeding devices 107, 108, 109 are operated by gradient liquid feeding of feeding liquid while changing the concentration ratio of the solvent fed, adjustment of the device difference of the retention time can be executed in a similar manner by adjusting the gradient liquid feeding start point (start point of changing the concentration ratio).

FIG. 8 is a view schematically showing chromatograms in the automatic adjustment process shown in FIG. 7.

In FIG. 8, (a) is a case the correction value $V_C$ exceeds 0, and (b) is a case the correction value $V_C$ is equal to or less than 0.

With respect to the analysis start point 801, the analysis finish point 802, and the analysis section 803 having been set beforehand, when the correction value $V_C$ exceeds 0, the sample introduction timing 804 is set to be later than the analysis start point 801. Also, when the correction value $V_C$ is equal to or less than 0, by setting the sample introduction timing 805 earlier than the analysis start point 801, adjustment of the device difference of the retention time is executed.

According to the second embodiment of the present invention, since it is configured to correct the device difference of the retention time among the multiple LC units 101, 102, 103 from the passing time $t_0$ of the non-retaining ingredient, the analysis performance can be improved.

Accordingly, in a manner similar to the first embodiment, it is possible to achieve an analysis apparatus having multiple liquid chromatographs capable of judging deterioration of the separation performance and the like at adequate timing and improving the analysis performance early and its analysis method.

Also, it is possible to combine the first embodiment and the second embodiment described above. That is to say, the device difference of the retention time is corrected based on the second embodiment, and, with respect to the LC unit where the device difference has been corrected, it is also possible to judge the peak separation performance of the measurement object sample and fluctuation of the passing time of the non-retaining ingredient and to execute the command of replacement of the separation column and the command of device maintenance of the LC system as done in the first embodiment.

Also, according to the present second embodiment, since the retention time of the column non-retaining ingredient acquired in a state the separation columns 113, 114, 115 are connected is used as the correction value (correction parameter) $V_C$, the dead volume of the separation columns 113, 114, 115 is considered in the correction value $V_C$. However, by acquiring the retention time in a state the separation columns 113, 114, 115 are not connected, it is also possible to calculate a correction parameter peculiar to a device excluding the dead volume of the separation columns 113, 114, 115.

Third Embodiment

Next, the third embodiment of the present invention will be explained.

Figure 9:
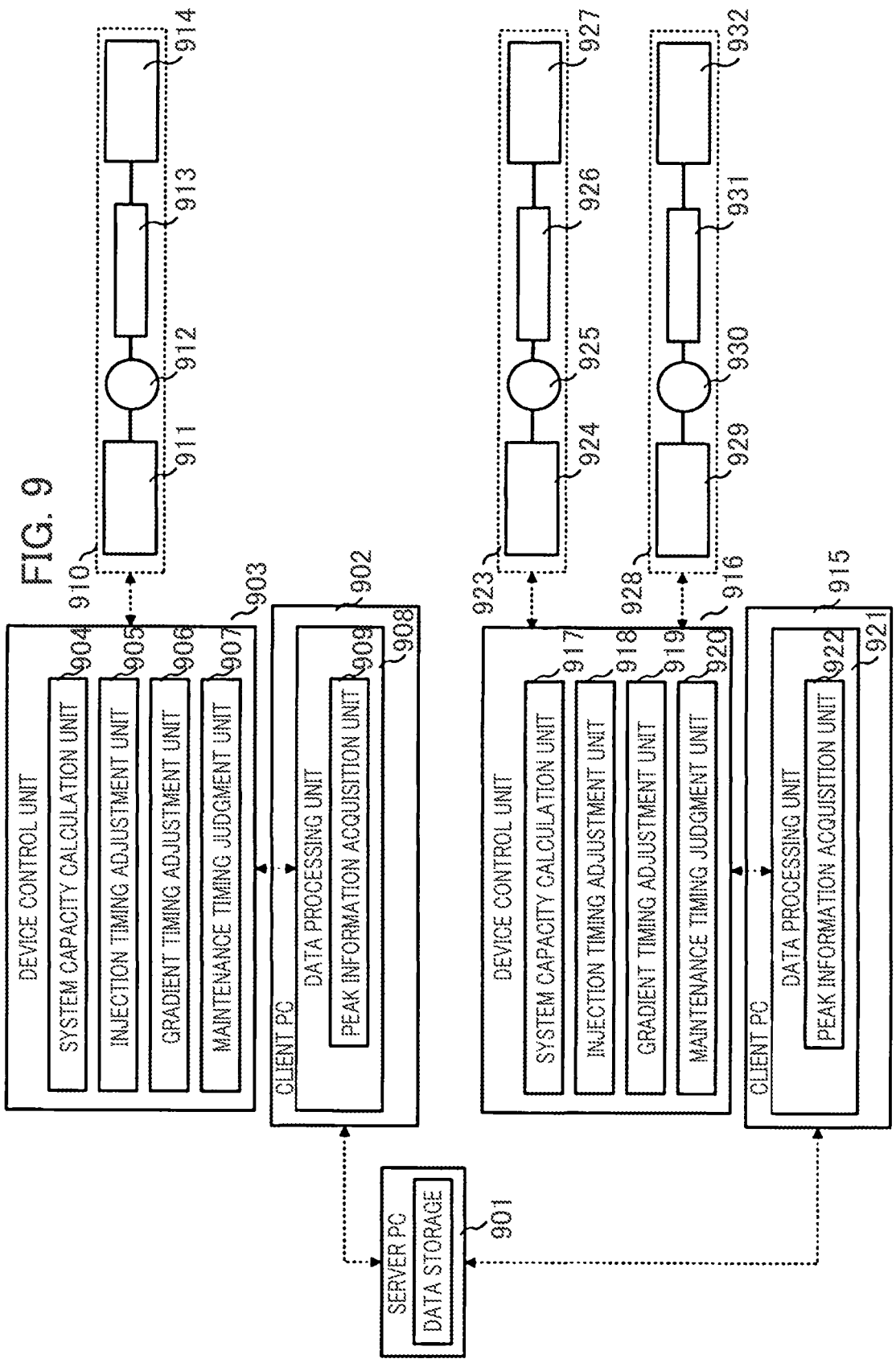
FIG. 9 is a schematic configuration diagram according to a third embodiment and is a view showing an example of connecting a plurality of LC systems apart from each other by client PCs and a server PC.

FIG. 9 is a schematic configuration diagram according to the third embodiment and is a view showing an example of connecting multiple LC systems (liquid chromatographs) 910, 923, 928 to each other by client PCs and a server PC, the LC systems (liquid chromatographs) 910, 923, 928 being apart from each other.

That is to say, by controlling the multiple LC systems 910, 923, 928 interposing a server PC 901 and multiple client PCs 902, 915 with respect to the LC systems having been independent from each other in the past, it is allowed to confirm the status of the LC systems by the first embodiment and to calculate the correction value of the device difference by the second embodiment.

In the system according to the present third embodiment, the client PCs 902, 915 for operating the independent LC systems 910, 923, 928 are connected to the server PC 901 that is for storing/sharing the data, and it is also possible to connect multiple LC systems to the client PCs 902, 915.

The LC system 910 is connected to a device control unit 903 that is for operating this LC system 910, and the LC systems 923 and 928 are connected to a device control unit 916 that is for operating each of the LC systems 923 and 928.

Also, the client PC 902 includes a data processing unit 908, and the client PC 915 includes a data processing unit 921. The LC system 910 is configured of a liquid feeding device 911, a sample dispensing mechanism 912, a separation column 913, and a detector 914, the liquid feeding device 911 being for feeding the mobile phase, the sample dispensing mechanism 912 including an introduction unit for introducing the measurement sample to the analysis flow passage, the separation column 913 separating the measurement sample into each component according to the chemical property, the detector 914 detecting the component having been separated.

Also, the LC system 923 is configured of a liquid feeding device 924, a sample dispensing mechanism 925, a separation column 926, and a detector 927, the liquid feeding device 924 being for feeding the mobile phase, the sample dispensing mechanism 925 including an introduction unit for introducing the measurement sample to the analysis flow passage, the separation column 926 separating the measurement sample into each component according to the chemical property, the detector 927 detecting the component having been separated.

Also, the LC system 928 is configured of a liquid feeding device 929, a sample dispensing mechanism 930, a separation column 931, and a detector 932, the liquid feeding device 929 being for feeding the mobile phase, the sample dispensing mechanism 930 including an introduction unit for introducing the measurement sample to the analysis flow passage, the separation column 931 separating the measurement sample into each component according to the chemical property, the detector 932 detecting the component having been separated.

The separation columns 913, 926, 931 are possibly stored in a column oven in order to keep the temperature inside the column constant, and it is possible to select a visible/ultraviolet absorptiometer, photodiode array detector, fluorodetector, mass spectrometer, and the like for the detectors 914, 927, 932.

The device control unit 903 includes a system capacity calculation unit 904, an injection timing adjustment unit 905, a gradient timing adjustment unit 906, and a maintenance timing judgment unit 907, and the data processing unit 908 includes a peak information acquisition unit 909.

The device control unit 916 includes a system capacity calculation unit 917, an injection timing adjustment unit 918, a gradient timing adjustment unit 919, and a maintenance timing judgment unit 920, and the data processing unit 921 includes a peak information acquisition unit 922.

In the system configuration according to the present third embodiment, the client PCs 902, 915 execute the confirmation process for the system status using the column non-retaining ingredient similarly to the first embodiment and the acquisition process of the correction value for correcting the device difference and the adjustment process for the sample induction timing similarly to the second embodiment. Also, the server PC 901 stores the measurement data of the LC systems 910, 932, 928 controlled between the different client PCs 902, 915, and the client PCs 902, 915 store the judgment reference value required for judging the timing of replacement of the column and maintenance of the device, the allowable range of the peak separation performance, the allowable range of the fluctuation of the passing time $t_0$, and the reference value $V_S$ required in calculating the correction value.

In calculating the correction value correcting the device difference of the retention time of the separation columns 913, 926, 931, the client PCs 902, 915 acquire the reference value $V_S$ from the server PC 901, execute calculation of the correction value, adjust the sample introduction timing by the sample dispensing mechanisms 912, 925, 930 and the start timing of gradient liquid feeding by the liquid feeding devices 911, 924, 929, and thereby execute adjustment of the retention time.

Also, the client PCs 902, 915 acquire the judgment reference value required for judging the timing of replacement of the column and maintenance of the device, the allowable range of the peak separation performance, and the allowable range of the fluctuation of the passing time $t_0$ from the server PC 901, and executes the command of replacement of the column and maintenance of the device. The command of replacement of the column and maintenance of the device is executed by an output unit connected to the data processing units 908, 921. Although it is not illustrated in FIG. 9, an output unit similar to the output unit 123 shown in FIG. 1 is connected to the data processing units 908, 921.

As described above, according to the third embodiment of the present invention, it is configured that the client PCs 902, 915 of the multiple LC systems 910, 923, 928 apart from each other are connected to the server PC 901 and executes adjustment of the passing time and so on using the judgment reference value required for judging the timing of replacement of the column and maintenance of the device, the allowable range of the peak separation performance, the allowable range of the fluctuation of the passing time $t_0$, and the reference value $V_S$ required in calculating the correction value having been stored in the server PC 901.

Accordingly, by the allowable range and the like unified in the multiple LC systems 910, 923, 928 apart from each other, the command of replacement of the separation column and so on can be executed, and it is allowed to judge deterioration of the separation performance and the like at adequate timing and to improve the analysis performance early in the multiple LC systems 910, 923, 928 apart from each other.

Further, each of the multiple LC systems 910, 923, 928 may be connected to a separate client PC, and optional multiple LC systems may be connected to one client PC.

REFERENCE SIGNS LIST

- 101, 102, 103 LC unit
- 104 sample dispensing mechanism
- 105 switching valve
- 106 detector
- 107, 108, 109, 911, 924, 929 liquid feeding device
- 110, 111, 112 sample introduction unit
- 113, 114, 115, 913, 926, 931 separation column
- 116, 903, 916 device control unit
- 117, 904, 917 system capacity calculation unit
- 118, 905, 918 injection timing adjustment unit
- 119, 906, 919 gradient timing adjustment unit
- 120, 907, 920 maintenance timing judgment unit
- 121, 908, 921 data processing unit
- 122, 909, 922 peak information acquisition unit
- 123 output unit
- 901 server PC
- 902, 915 client PC
- 910, 923, 928 LC system

What is claimed is:

1. An analysis apparatus having a plurality of liquid chromatographs, comprising:
    the multiple liquid chromatographs each of which comprises a separation column to receive a sample and separate the received same into components;
    a detector to detect the components of the sample fed from each of the multiple liquid chromatographs;
    a data processing unit to process detection data detected by the detector; a device control unit to control the multiple liquid chromatographs and the detector; and
    an output unit,
    wherein the device control unit judges a device status of the multiple liquid chromatographs in accordance with data that is obtained by detecting a measurement object sample and a non-retaining ingredient sample introduced into any one of the multiple liquid chromatographs by the detector and that is processed by the data processing unit;
    wherein the device control unit judges a device status of the multiple liquid chromatographs on the basis of peak separation performance of the measurement object sample and fluctuation of retention time of the non-retaining ingredient sample;
    wherein the device control unit judges whether or not peak separation performance of the measurement object sample is within a peak separation allowable range, outputs a separation column replacement instruction to the output unit when fluctuation of retention time of the non-retaining ingredient sample is within a fluctuation allowable range, and outputs a device maintenance instruction to the output unit when the peak separation performance is not within the peak separation allowable range and the fluctuation of the retention time of the non-retaining ingredient sample is not within the fluctuation allowable range.

2. The analysis apparatus having a plurality of liquid chromatographs according to claim 1,
    wherein the data processing unit calculates a capacity after the non-retaining ingredient sample is introduced into any one of the multiple liquid chromatographs to the detector on the basis of retention time of the non-retaining ingredient sample and calculates a correction value from a difference between the calculated capacity and a reference capacity value, and
    wherein the device control unit adjusts a timing of introducing the non-retaining ingredient sample and a measurement object sample into the multiple liquid chromatographs and a timing of collecting data by the data processing unit on the basis of the correction value.

3. The analysis apparatus having a plurality of liquid chromatographs according to claim 1,
    wherein the analysis apparatus has a plurality of client PCs to which at least one of the multiple liquid chromatographs is connected and a server PC to which the multiple client PCs are connected.

4. The analysis apparatus having a plurality of liquid chromatographs according to claim 1,
    wherein the device control unit, outputs a separation column replacement instruction to the output unit when the peak separation performance is not within the peak separation allowable range but fluctuation of retention time of the non-retaining ingredient sample is within a fluctuation allowable range.

5. The analysis apparatus having a plurality of liquid chromatographs according to claim 1,
    wherein the device control unit introduces the measurement object sample into any one of the multiple liquid chromatographs and introduces the non-retaining ingredient sample and the measurement object sample into any one of the multiple liquid chromatographs when the peak separation performance is not within the peak separation allowable range.

6. The analysis apparatus having a plurality of liquid chromatographs according to claim 1, wherein the detector is a mass spectrometer.

7. An analysis method of a plurality of liquid chromatographs, comprising the multiple liquid chromatographs each of which has a separation column to receive a sample and separate the received sample into components, a detector to detect the components of the sample fed from each of the multiple liquid chromatographs, a data processing unit to process detection data detected by the detector, and a device control unit to control the multiple liquid chromatographs and the detector,
    the analysis method comprising the steps of:
    detecting a measurement object sample and a non-retaining ingredient sample introduced into any one of the multiple liquid chromatographs and not retained in the separation column by the detector;
    judging a device status of the multiple liquid chromatographs on the basis of peak separation performance of the measurement object sample and fluctuation of retention time of the non-retaining ingredient sample;
    judging whether or not peak separation performance of the measurement object sample is within a peak separation allowable range;
    outputting a separation column replacement instruction to an output unit when fluctuation of retention time of the non-retaining ingredient sample is within a fluctuation allowable range; and
    outputting a device maintenance instruction to the output unit when the peak separation performance is not within the peak separation allowable range and the fluctuation of the retention time of the non-retaining ingredient sample is not within the fluctuation allowable range.

8. The analysis method of a plurality of liquid chromatographs according to claim 7, the analysis method further comprising the steps of:
    calculating a capacity after the non-retaining ingredient sample is introduced into any one of the multiple liquid chromatographs to the detector on the basis of retention time of the non-retaining ingredient sample;

calculating a correction value from a difference between the calculated capacity and a reference capacity value; and adjusting a timing of introducing the non-retaining ingredient sample and the measurement object sample into the multiple liquid chromatographs and a timing of collecting data on the basis of the correction value by the device control unit.

9. The analysis method of a plurality of liquid chromatographs according to claim 7, the analysis method further comprising the steps of:

connecting at least one of the multiple liquid chromatographs to a plurality of client PCs; and connecting the multiple client PCs to a server PC.

10. The analysis method of a plurality of liquid chromatographs according to claim 7, the outputting the separation column replacement instruction comprising outputting the separation column replacement instruction to an output unit when the peak separation performance is not within the peak separation allowable range but fluctuation of retention time of the non-retaining ingredient sample is within a fluctuation allowable range.

11. The analysis method of a plurality of liquid chromatographs according to claim 7, the analysis method further comprising the steps of:

introducing the measurement object sample into any one of the multiple liquid chromatographs prior to the judging the peak separation performance; and introducing the non-retaining ingredient sample and the measurement object sample into any one of the multiple liquid chromatographs when the peak separation performance is not within the peak separation allowable range prior to the outputting.

* * * * *